(12) United States Patent
Lim et al.

(10) Patent No.: US 10,412,476 B2
(45) Date of Patent: Sep. 10, 2019

(54) ELECTRONIC DEVICE WITH SPEAKER

(71) Applicant: Samsung Electronics Co., Ltd., Gyeonggi-do (KR)

(72) Inventors: Ji-Young Lim, Gyeongsangbuk-do (KR); Junho Ko, Gyeongsangbuk-do (KR); Wonwoo Yoo, Daegu (KR); Jang-Hoon Hong, Gyeongsangbuk-do (KR); Youngjun An, Gyeongsangbuk-do (KR); Hyun-Suk Choi, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/643,715

(22) Filed: Jul. 7, 2017

(65) Prior Publication Data

US 2018/0035188 A1 Feb. 1, 2018

(30) Foreign Application Priority Data

Jul. 29, 2016 (KR) .......................... 10-2016-0097082

(51) Int. Cl.
*H04R 1/02* (2006.01)
*G06F 3/041* (2006.01)
(Continued)

(52) U.S. Cl.
CPC ........... *H04R 1/028* (2013.01); *G06F 1/1643* (2013.01); *G06F 1/1688* (2013.01);
(Continued)

(58) Field of Classification Search
CPC .......... H04R 1/028; H04R 1/403; H04R 3/12; H04R 7/16; H04R 2499/11; G06F 3/0416
See application file for complete search history.

(56) References Cited

U.S. PATENT DOCUMENTS 9,395,862 B2 * 7/2016 Kim ....................... G06F 3/041
2006/0025179 A1 2/2006 Kim
(Continued)

FOREIGN PATENT DOCUMENTS

JP 2005-260536 A 9/2005
JP 2006-042295 A 2/2006
(Continued)

*Primary Examiner* — Andrew L Sniezek
(74) *Attorney, Agent, or Firm* — Cha & Reiter, LLC

(57) ABSTRACT

An electronic device is disclosed that may include a housing including a first surface facing in a first direction, a second surface facing in a second direction, and a third surface, the first and second direction being generally opposed to one another, the third surface being positioned between the first and second surfaces and being generally orthogonal relative to the first and second directions; at least one speaker arranged in at least a part of the housing; and a speaker enclosure protecting the speaker. The speaker enclosure may include an upper speaker enclosure arranged to face the first surface; and a lower speaker enclosure arranged to face the second surface, and confronting the upper speaker enclosure. Each of the upper and lower speaker enclosures may be at least partially made with magnetic materials that shield a magnetic flux generated in the speaker.

8 Claims, 16 Drawing Sheets

(51) Int. Cl.
*H04R 1/40* (2006.01)
*H04R 3/12* (2006.01)
*H04R 7/16* (2006.01)
*G06F 1/16* (2006.01)

(52) U.S. Cl.
CPC ............ *G06F 3/0416* (2013.01); *H04R 1/02* (2013.01); *H04R 1/403* (2013.01); *H04R 3/12* (2013.01); *H04R 7/16* (2013.01); *H04R 2209/022* (2013.01); *H04R 2225/49* (2013.01); *H04R 2499/11* (2013.01)

(56) References Cited

U.S. PATENT DOCUMENTS

| | | | |
|---|---|---|---|
| 2006/0182304 A1 | 8/2006 | Takase et al. | |
| 2010/0304796 A1* | 12/2010 | Stohr | H04M 1/03 |
| | | | 455/575.1 |
| 2013/0169584 A1* | 7/2013 | Konradi | G06F 3/0416 |
| | | | 345/174 |
| 2015/0229353 A1* | 8/2015 | Berthelsen | H04M 9/082 |
| | | | 379/406.08 |
| 2016/0073558 A1* | 3/2016 | Kole | H05K 9/0052 |
| | | | 361/818 |
| 2018/0088739 A1* | 3/2018 | Rouaissia | H03K 17/955 |

FOREIGN PATENT DOCUMENTS

| | | |
|---|---|---|
| KR | 1999-0078983 A | 11/1999 |
| KR | 10-2006-0023329 A | 3/2006 |

* cited by examiner

ELECTRONIC DEVICE WITH SPEAKER

CLAIM OF PRIORITY

This application claims priority under 35 U.S.C. § 119(a) to a Korean Patent Application entitled "ELECTRONIC DEVICE WITH SPEAKER" filed in the Korean Intellectual Property Office on Jul. 29, 2016 and assigned Serial No. 10-2016-0097082, the entire contents of which are hereby incorporated herein by reference.

BACKGROUND

1. Technical Field

Various exemplary embodiments of the present disclosure relate to an electronic device with a speaker.

2. Description of the Related Art

Generally, to decrease the thickness of an electronic device, that is, to achieve the slimness of the electronic device, the electronic device can mount at least one or more speakers, for instance, thin film speakers. The speakers mounted in the electronic device can emit sound in a front direction or rear direction or lateral direction of the electronic device in accordance with mounting positions thereof. Also, to decrease the thickness of the electronic device, at least one or more speakers can be mounted to have a structure of emitting sound in the lateral direction of the electronic device.

SUMMARY

To mount this speaker in the electronic device, an enclosure, i.e., an installation member can be used to stably fix the speaker within the electronic device. For instance, stainless installation members, which are the installation members, may be arranged up/down the speaker to accomplish a structure of fixing the speaker within the electronic device.

However, in the case of an electronic device using a digitizer as an input device, the electronic device has to shield a magnetic flux applied to the digitizer.

Various exemplary embodiments of the present disclosure may provide an electronic device for, in the case of a speaker in need of magnetic force shielding, compensating a magnetic flux density having been lost due to the magnetic force shielding, thereby preventing a decrease of a sound pressure that is generated in the speaker.

Also, various exemplary embodiments of the present disclosure can provide an electronic device for, in the case of a speaker not in need of magnetic force shielding, increasing an intensity of a magnetic flux density, thereby increasing a sound pressure that is generated in the speaker.

An electronic device may include a housing including a first surface facing in a first direction, a second surface facing in a second direction, and a third surface, the first and second direction being generally opposed to one another, the third surface being positioned between the first and second surfaces and being generally orthogonal relative to the first and second directions; at least one speaker arranged in at least a part of the housing; and a speaker enclosure protecting the speaker. The wherein the speaker enclosure may include: an upper speaker enclosure arranged to face the first surface; and a lower speaker enclosure arranged to face the second surface, and confronting the upper speaker enclosure. Each of the upper and lower speaker enclosures are at least partially made with magnetic materials that shield a magnetic flux generated in the speaker.

The speaker may include a first speaker and a second speaker that are arranged approximately symmetrically relative to a home key of the electronic device when viewed from a front of the electronic device, the respective first and second speakers emitting sound toward the third surface of the housing of the electronic device respectively. The upper speaker enclosure may be supported by an internal support structure of the electronic device, the internal support structure at least partially comprising metallic materials. At least part of the housing may include a magnetic material, and the lower speaker enclosure is mounted on the at least part of the housing including the magnetic material. The respective upper and lower speaker enclosures may each be configured to have the same thickness. Alternatively, the respective upper and lower speaker enclosures may be configured to have different thicknesses. The first speaker and the second speaker may be arranged side by side without overlapping with each other. The electronic device of claim 1 may further include a digitizer arranged to be spaced apart in parallel over the first and second speakers; and a touch screen display arranged on the digitizer.

In a further embodiment, an electronic device may further include: a housing comprising a first surface facing a first direction, a second surface facing a second direction that is a direction opposite to the first direction, and a third surface disposed between the first and second surfaces and facing a third direction, the third direction being generally orthogonal relative to each of the first and second directions; at least one or more speakers arranged in at least a part of the housing, to emit sound in the third direction; and a speaker enclosure protecting the speaker. The speaker enclosure may include: an upper speaker enclosure arranged to face the first surface; and a lower speaker enclosure arranged to face the second surface, and confronting the upper speaker enclosure. The upper speaker enclosure may be made with nonmagnetic materials, and the lower speaker enclosure is at least partially made with magnetic materials. As the lower speaker enclosure increases in thickness, the lower speaker prevents leakage of a magnetic flux to a greater extent, thereby increasing a sound pressure generated in the speaker.

In a further embodiment, an electronic device may include: a housing comprising a first surface facing a first direction, a second surface facing a second direction that is a direction opposite to the first direction, and a third surface disposed between the first and second surfaces and facing a third direction that is orthogonal relative to each of the first and second directions; at least one or more speakers arranged in at least a part of the housing, and emitting sound in the third direction; and a speaker enclosure protecting the speaker. The speaker enclosure may include: an upper speaker enclosure arranged to face the first surface; and a lower speaker enclosure arranged to face the second surface, and confronting the upper speaker enclosure. Each of the upper and lower speaker enclosures may be made with nonmagnetic materials, and the lower speaker enclosure may be arranged to overlap with at least a part of the housing of magnetic materials of the electronic device. The housing of the magnetic materials shields a magnetic flux generated in the speaker. The lower speaker enclosure may be attached to the at least part of the housing.

In an embodiment, the electronic device may further include a yoke, the speaker being supported by a yoke of metallic materials within the electronic device, wherein as the yoke increases in thickness, the greater a shielding of a magnetic flux generated by the speaker. The housing may be formed from metallic materials, and as the housing increases in thickness, a greater a shielding of a magnetic flux. The lower speaker enclosure and the housing may be manufactured as one piece.

These and other embodiments of the present disclosure are more fully described hereinbelow with reference to the accompanying figures.

DETAILED DESCRIPTION

Figure 1:
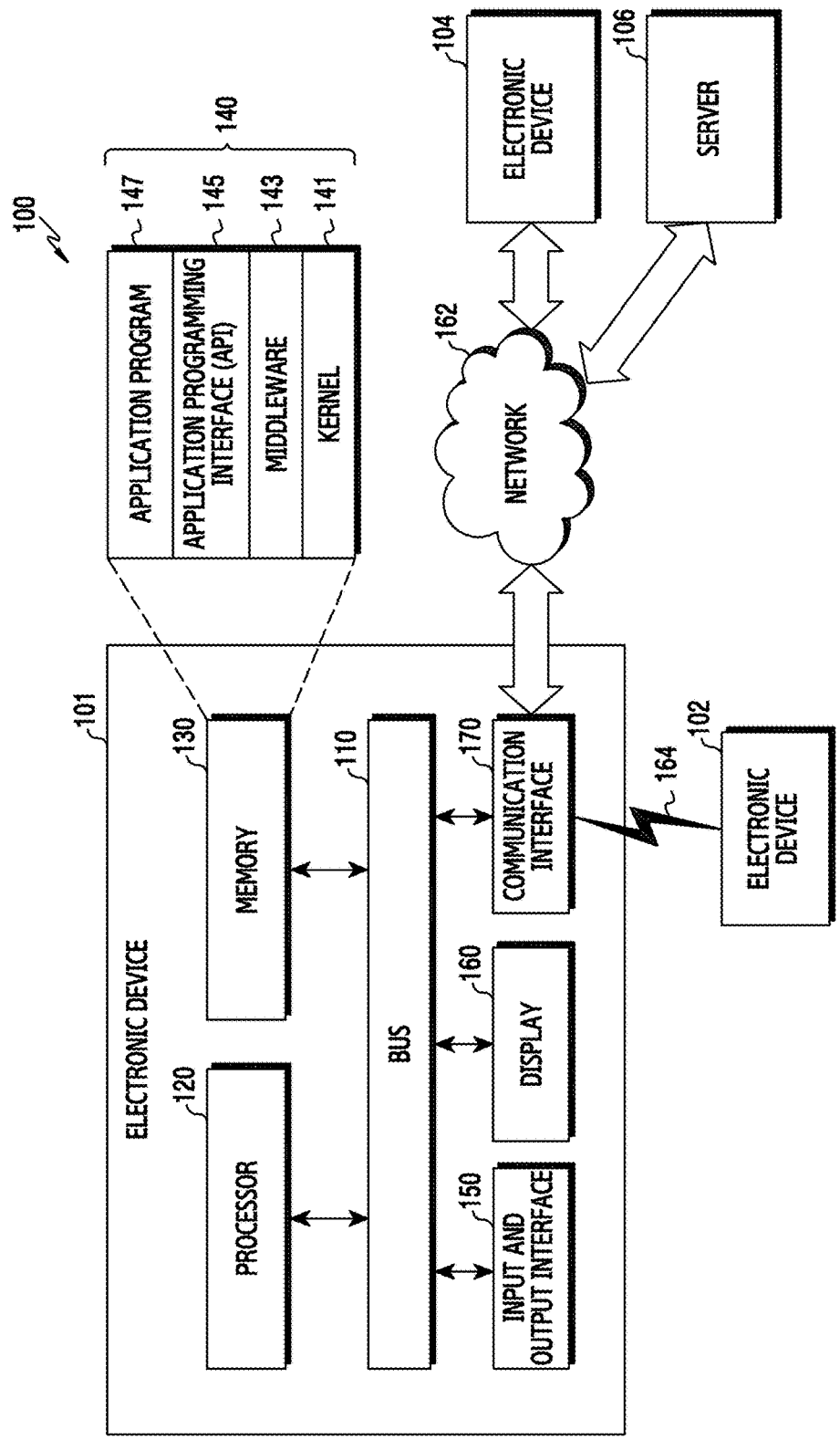
FIG. 1 is a block diagram illustrating a construction of an electronic device within a network environment according to various exemplary embodiments.

Hereinafter, embodiments of the present disclosure will be described in connection with the accompanying drawings.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications, equivalents, and/or alternatives within the spirit and scope of the present description. In the description of the drawings, similar reference numerals may be used to designate similar elements.

As used in describing embodiments of the present disclosure, the expressions "include", "may include" and other conjugates refer to the existence of a corresponding disclosed function, operation, or constituent element, and do not limit one or more additional functions, operations, or constituent elements. Further, as used to describe the embodiments of the present disclosure, the terms "include", "have", and their conjugates merely denote a certain feature, numeral, step, operation, element, component, or a combination thereof, and do not exclude the existence or possibility of addition of one or more other features, numerals, steps, operations, elements, components, or combinations thereof.

In describing embodiments of the present disclosure, the expression "or" or "at least one of A or/and B" includes any or all of combinations of words listed together. For example, the expression "A or B" or "at least A or/and B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, a first element may be referred to as a second element, and likewise a second element may also be referred to as a first element without departing from the scope of embodiments of the present disclosure.

When an element is referred to as being "coupled" or "connected" to any other element, it should be understood that not only the element may be coupled or connected directly to the other element, but also a third element may be interposed therebetween. Contrarily, when an element is referred to as being "directly coupled" or "directly connected" to any other element, it should be understood that no other element is interposed therebetween.

The terms used in embodiments of the present disclosure are used merely to describe one or more certain embodiments and are not intended to limit the present disclosure. As used herein, singular forms may include plural forms as well unless the context explicitly indicates otherwise. Furthermore, all terms used herein, including technical and scientific terms, have the same meaning as commonly understood by those of skill in the art to which the present disclosure pertains. Such terms as those defined in a generally used dictionary are to be interpreted to have the same meanings as the contextual meanings in the relevant field of art, and are not to be interpreted to have ideal or excessively formal meanings unless clearly defined in embodiments of the present disclosure.

An electronic device according to the present disclosure may be a device including a communication function. For example, the electronic device may include at least one of a Smartphone, a Tablet Personal Computer (PC), a Mobile Phone, a Video Phone, an Electronic Book (e-book) reader, a Desktop PC, a Laptop PC, a Netbook Computer, a Personal Digital Assistant (PDA), a portable multimedia player (PMP), an MP3 player, a Mobile Medical Appliance, a Camera, and a Wearable Device (e.g. a head-mounted-device, such as electronic glasses, electronic clothes, an electronic bracelet, an electronic necklace, an electronic appcessory, electronic tattoos, or a smartwatch).

According to certain embodiments, the electronic device may be a smart home appliance with a communication function. For example, the smart home appliance may include at least one of a television, a digital video disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to certain embodiments, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

According to certain embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter).

The electronic device according to the present disclosure may be a combination of one or more of the aforementioned various devices. Further, the electronic device according to the present disclosure may be a flexible device. Further, it will be apparent to those skilled in the art that the electronic device according to the present disclosure is not limited to the aforementioned devices.

Hereinafter, an electronic device according to the present disclosure will be described with reference to the accompanying drawings. The term "user" as used in embodiments of the present disclosure may indicate a person who uses an electronic device or a device (e.g., artificial intelligence electronic device) that uses an electronic device.

FIG. 1 is a block diagram of an example of a network environment, according to the present disclosure.

Referring to FIG. 1, an electronic device 101 may include at least one of a bus 110, a processor 120, a memory 130, an input/output interface 150, a display 160, and a communication interface 170. According to the present disclosure, at least one of the components of the electronic device 101 may be omitted, or other components may be additionally included in the electronic device 101.

The bus 110 may be a circuit that interconnects the aforementioned elements and transmits communication signals (e.g., control messages) between the aforementioned elements.

The processor 120 may carry out operations or data processing related to control and/or communication of at least one other component (for example, the memory 130, the input/output interface 150, the display 160, or the communication interface 170) of the electronic device 101.

The memory 130 may store commands or data (e.g., a reference pattern or a reference touch area) associated with one or more other components of the electronic device 101. According to one embodiment, the memory 130 may store software and/or a program 140. The program 140 may include, for example, a kernel 141, a middleware 143, an application programming interface (API) 145, an application program 147, or the like, with one or more of the kernel 141, the middleware 143, and the API 145 being referred to as an Operating System (OS).

The kernel 141 may control or manage system resources (e.g., the bus 110, the processor 120, or the memory 130) used for performing an operation or function implemented by the other programs (e.g., the middleware 143, the API 145, or the application program 147). Furthermore, the kernel 141 may provide an interface through which the middleware 143, the API 145, or the application program 147 may access the individual elements of the electronic device 101 to control or manage the system resources.

The middleware 143 may, for example, function as an intermediary for allowing the API 145 or the application program 147 to communicate with the kernel 141 to exchange data. In addition, the middleware 143 may process one or more task requests received from the application program 147 according to priorities thereof. For example, the middleware 143 assigns priorities for using the system resources (e.g., the bus 110, the processor 120, the memory 130, or the like) of the electronic device 101, to at least one application of the application program 147. The middleware 143 may perform scheduling or loading balancing on the one or more task requests by processing the one or more task requests according to the priorities assigned thereto.

The API 145 may be an interface through which the application 147 controls functions provided from the kernel 141 or the middleware 143, and may include, for example, at least one interface or function (e.g., an instruction) for file control, window control, image processing, or text control.

The input/output interface 150 forwards instructions or data input from a user through an input/output device (e.g., various sensors, such as an acceleration sensor or a gyro sensor, and/or a device such as a keyboard or a touch screen), to the processor 120, the memory 130, or the communication interface 170 through the bus 110. For example, the input/output interface 150 provides the processor 120 with data on a user' touch entered on a touch screen. Furthermore, the input/output interface 150 may output instructions or data, received from, for example, the processor 120, the memory 130, or the communication interface 170 via the bus 110, through an output unit (e.g., a speaker or the display 160).

The display 160 includes, for example, a liquid crystal display (LCD), a light emitting diode (LED) display, an organic LED (OLED) display, a micro electro mechanical system (MEMS) display, an electronic paper display, and the like. The display 160, for example, displays various types of content (e.g., a text, images, videos, icons, symbols, and the like) for the user. The display 160 may include a touch screen and receive, for example, a touch, a gesture, proximity, a hovering input, and the like, using an electronic pen or the user's body part. According to an embodiment of the present disclosure, the display 160 may display a web page.

The communication interface 170, for example, may set communication between the electronic device 101 and an external device (e.g., a first external electronic device 102, a second external electronic device 104, or a server 106). For example, the communication interface 170 may connect to a network 162 through wireless or wired communication to communicate with the external device (e.g., the second external electronic device 104 or the server 106).

The wireless communication may use at least one of, for example, long term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, a short range communication 164. The short-range communication 164 may include at least one of, for example, wireless fidelity (Wi-Fi), Bluetooth (BT), near field communication (NFC), and GPS.

Each of the first external electronic device 102 and the second external electronic device 104 may be a device which is the same as or different from the electronic device 101. According to an embodiment of the present disclosure, the server 106 may include a group of one or more servers. According to the present disclosure, all or a part of operations performed in the electronic device 101 can be performed in the other electronic device or multiple electronic devices (e.g., the first external electronic device 102 or the second external electronic device 104 or the server 106). According to an embodiment of the present disclosure, when the electronic device 101 should perform some functions or services automatically or by a request, the electronic device 101 may make a request for performing at least some functions related to the functions or services by another device (e.g., the first external electronic device 102, the second external electronic device 104, or the server 106) instead of performing the functions or services by itself. The first external electronic device 102, the second external electronic device 104, and/or the server 106 may perform a function requested from the electronic device 101 or an additional function and transfer the performed result to the electronic device 101. The electronic device 101 may provide the requested function or service to another electronic device by processing the received result as it is or additionally. To this end, for example, cloud computing, distributed computing, or client-server computing technology may be used.

Figure 2:
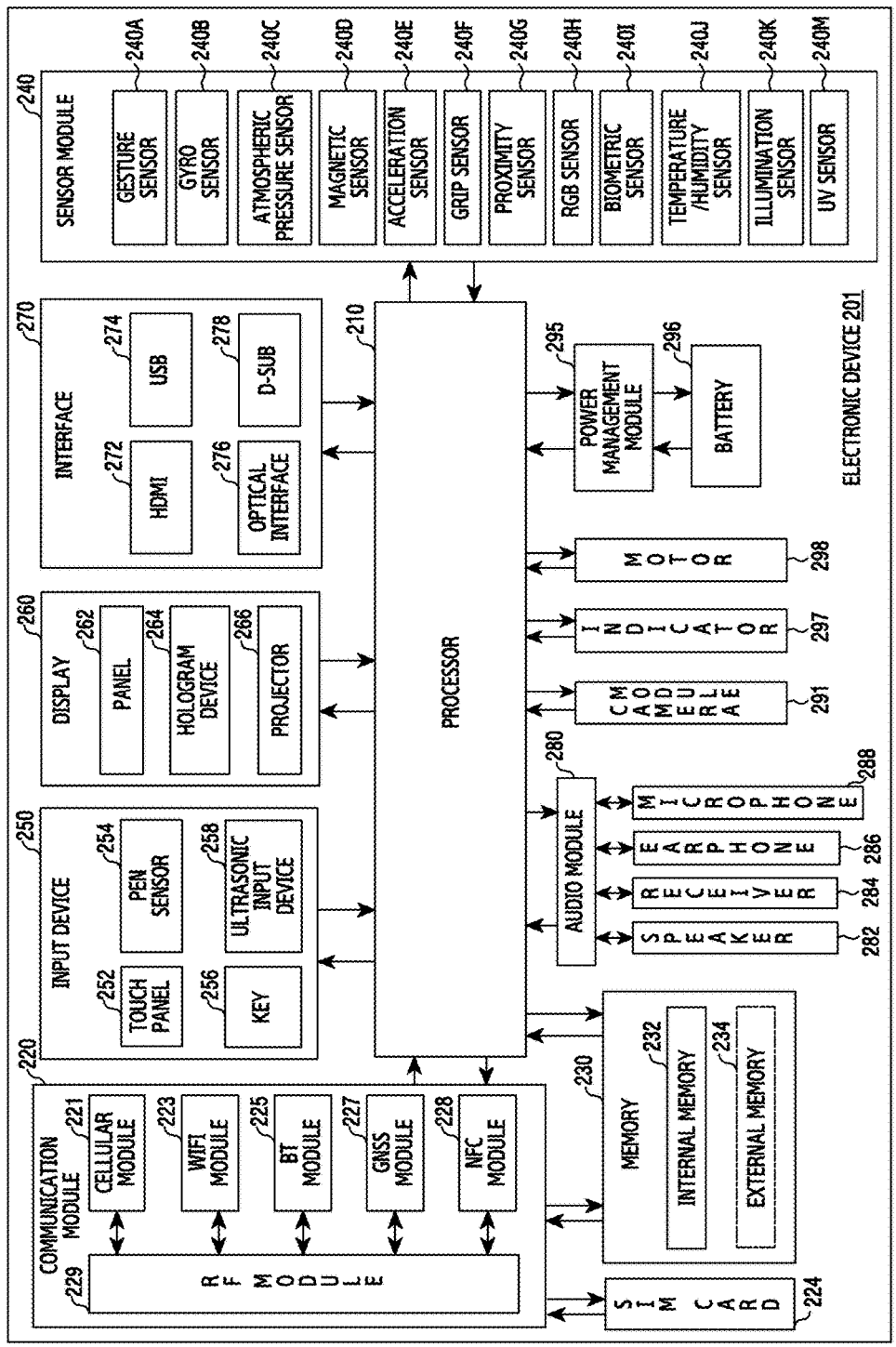
FIG. 2 is a block diagram of an electronic device according to various exemplary embodiments.

FIG. 2 is a block diagram of an example of an electronic device, according to the present disclosure.

The electronic device 201 may constitute, for example, the entirety or a part of the electronic device 101 illustrated in FIG. 1, or may expand all or some elements of the electronic device 101. Referring to FIG. 2, the electronic device 201 includes an application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may run an operating system or an application program to control a plurality of hardware or software constituent elements connected to the AP 210, and may perform processing and operation of various data including multimedia data. The AP 210 may be, for example, implemented as a system on chip (SoC). According to an embodiment of the present disclosure, the AP 210 further includes a graphical processing unit (GPU). The AP 210 further includes at least one of other constitute elements (e.g., the cellular module 221). The AP 210 loads an instruction or data, which is received from a non-volatile memory connected to each or at least one of other constituent elements, to a volatile memory and processes the loaded instruction or data. In addition, the AP 210 stores in the non-volatile memory, data received from at least one of the other constituent elements or generated by at least one of the other constituent elements.

The communication module 220 (e.g., the communication interface 170) performs data transmission/reception in communication between the electronic device 201 (e.g., the electronic device 101) and other electronic devices connected through a network. According to an embodiment of the present disclosure, the communication module 220 may include cellular module 221, a Wi-Fi module 223, a BT module 225, a GPS module 227, an NFC module 228, and/or a radio frequency (RF) module 229.

The cellular module 221 provides a voice telephony, a video telephony, a text service, an Internet service, and the like, through a telecommunication network (e.g., LTE, LTE-A, CDMA, WCDMA, UMTS, WiBro, GSM, and the like). In addition, the cellular module 221 may, for example, use a SIM card 224 to perform electronic device distinction and authorization within the telecommunication network. According to an embodiment of the present disclosure, the cellular module 221 may perform at least some of functions that the AP 210 may provide. For example, the cellular module 221 performs at least one part of a multimedia control function.

The WiFi module 223, the BT module 225, the GPS module 227 and the NFC module 228 each may include, for example, a processor for processing data transmitted/received through the corresponding module. According to an embodiment of the present disclosure, at least some (e.g., two or more) of the cellular module 221, the WiFi module 223, the BT module 225, the GPS module 227 and the NFC module 228 are included within one IC or IC package.

The RF module 229 performs transmission/reception of data, for example, transmission/reception of an RF signal. The RF module 229 may include, for example, a transceiver, a power amplifier module (PAM), a frequency filter, a low noise amplifier (LNA), an antenna and the like. According to an embodiment of the present disclosure, at least one of the cellular module 221, the WiFi module 223, the BT module 225, the GPS module 227 or the NFC module 228 may perform transmission/reception of an RF signal through a separate RF module.

The SIM card 224 includes a SIM, and may be inserted into a slot provided in a specific position of the electronic device 201. The SIM card 224 includes unique identification information (e.g., an integrated circuit card ID (ICCID)) or subscriber information (e.g., an international mobile subscriber identity (IMSI)).

The memory 230 may include an internal memory 232 or an external memory 234. The internal memory 232 includes, for example, at least one of a volatile memory (e.g., a dynamic random access memory (DRAM), a static RAM (SRAM) and a synchronous DRAM (SDRAM)) or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, and a not or (NOR) flash memory).

According to an embodiment of the present disclosure, the internal memory 232 may be a solid state drive (SSD). The external memory 234 may further include a flash drive, for example, compact flash (CF), secure digital (SD), micro-SD, mini-SD, extreme digital (xD), a memory stick, and the like. The external memory 234 may be operatively connected with the electronic device 201 through various interfaces.

The sensor module 240 measures a physical quantity or detects an activation state of the electronic device 101, and converts measured or detected information into an electric signal. The sensor module 240 may include, for example, at least one of a gesture sensor 240A, a gyro sensor 240B, an air pressure sensor 240C, a magnetic sensor 240D, an acceleration sensor 240E, a grip sensor 240F, a proximity sensor 240G, a color sensor 240H (e.g., a red, green, blue (RGB) sensor), a bio-physical sensor 240I, a temperature/humidity sensor 240J, an illumination sensor 240K, a ultra-violet (UV) sensor 240M, and the like. Additionally or alternatively, the sensor module 240 may also include, for example, an E-nose sensor, an electromyography (EMG) sensor, an electroencephalogram (EEG) sensor, an electrocardiogram (ECG) sensor, an infrared (IR) sensor, an iris sensor, a fingerprint sensor, and the like. The sensor module 240 may further include a control circuit for controlling at least one or more sensors belonging therein.

The input device 250 includes a touch panel 252, a pen sensor 254, which may be digital, a key 256, an ultrasonic input device 258, and the like. The touch panel 252 may, for example, detect a touch input in at least one of a capacitive overlay scheme, a pressure sensitive scheme, an infrared beam scheme, and an acoustic wave scheme. The touch panel 252 may also include a control circuit. In a case of the capacitive overlay scheme, physical contact or proximity detection is possible. The touch panel 252 may further include a tactile layer, to provide a tactile response to a user.

The pen sensor 254 may be implemented in the same or similar method to receiving a user's touch input or by using a separate sheet for detection. The key 256 may include, for example, a physical button, an optical key, or a keypad. The ultrasonic input device 258 is capable of identifying data by detecting a sound wave in the electronic device 201 through an input tool generating an ultrasonic signal, and enables wireless detection. According to an embodiment of the present disclosure, the electronic device 201 may also use the communication module 220 to receive a user input from a connected external device (e.g., a computer or a server).

The display 260 (e.g., the display 160) includes a panel 262, a hologram device 264, or a projector 266. The panel 262 may be, for example, an LCD, an Active-Matrix Organic LED (AMOLED), and the like. The panel 262 may be, for example, implemented to be flexible, transparent, or wearable. The panel 262 may be constructed as one module along with the touch panel 252 as well. The hologram device 264 may use interference of light to show a three-dimensional image in the air. The projector 266 may project light to a screen to display an image. The screen may be, for example, located inside or outside the electronic device 201. According to an embodiment of the present disclosure, the display 260 may further include a control circuit for controlling the panel 262, the hologram device 264, or the projector 266.

The interface 270 includes, for example, a high-definition multimedia interface (HDMI) 272, a universal service bus (USB) 274, an optical interface 276, or a D-subminiature (D-sub) 278. Additionally or alternatively, the interface 270 includes, for example, a mobile high-definition link (MHL) interface, an SD card/multimedia card (MMC) interface or an infrared data association (IrDA) standard interface.

The audio module 280 converts a voice and an electric signal interactively. The audio module 280 may, for example, process sound information which is inputted or outputted through a speaker 282, a receiver 284, an earphone 286, the microphone 288, and the like.

The camera module 291 takes still pictures and moving pictures. According to an embodiment of the present disclosure, the camera module 291 includes one or more image sensors (e.g., a front sensor or a rear sensor), a lens, an image signal processor (ISP), or a flash (e.g., an LED or a xenon lamp).

The power management module 295 manages electric power of the electronic device 201. The power management module 295 includes, for example, a power management integrated circuit (PMIC), a charger IC, a battery, a battery gauge, and the like.

The PMIC may be, for example, mounted within an integrated circuit or an SoC semiconductor. A charging scheme may be divided into a wired charging scheme and a wireless charging scheme. The charger IC charges the battery 296, and prevents the inflow of overvoltage or overcurrent from an electric charger. According to an embodiment of the present disclosure, the charger IC includes a charger IC for at least one of the wired charging scheme or the wireless charging scheme. The wireless charging scheme may, for example, be a magnetic resonance scheme, a magnetic induction scheme, an electromagnetic wave scheme, and the like. A supplementary circuit for wireless charging, for example, a circuit, such as a coil loop, a resonance circuit, a rectifier, and the like, may be added.

The battery gauge may, for example, measure a level of the battery 296, which may be for example, a voltage during charging, a current and/or a temperature. The battery 296 generates or stores electricity, and uses the stored or generated electricity to supply power to the electronic device 201. The battery 296 may include, for example, a rechargeable battery or a solar battery.

The indicator 297 displays a specific status of the electronic device 201 or one part (e.g., the AP 210) thereof, for example a booting state, a message state, a charging state, and the like. The motor 298 may convert an electric signal into a mechanical vibration. The electronic device 101 may include a processing device (e.g., a GPU) for mobile TV support. The processing device for mobile TV support may, for example, process media data according to the standards of digital multimedia broadcasting (DMB), digital video broadcasting (DVB), a media flow, and the like.

Each of the above-described elements of the electronic device may include one or more components, and the name of a corresponding element may vary according to the type of electronic device. The electronic device according to the present disclosure may include at least one of the above-described elements and may exclude some of the elements or further include other additional elements. Further, some of the elements of the electronic device according to the present disclosure may be coupled to form a single entity while performing the same functions as those of the corresponding elements before the coupling.

Figure 3:
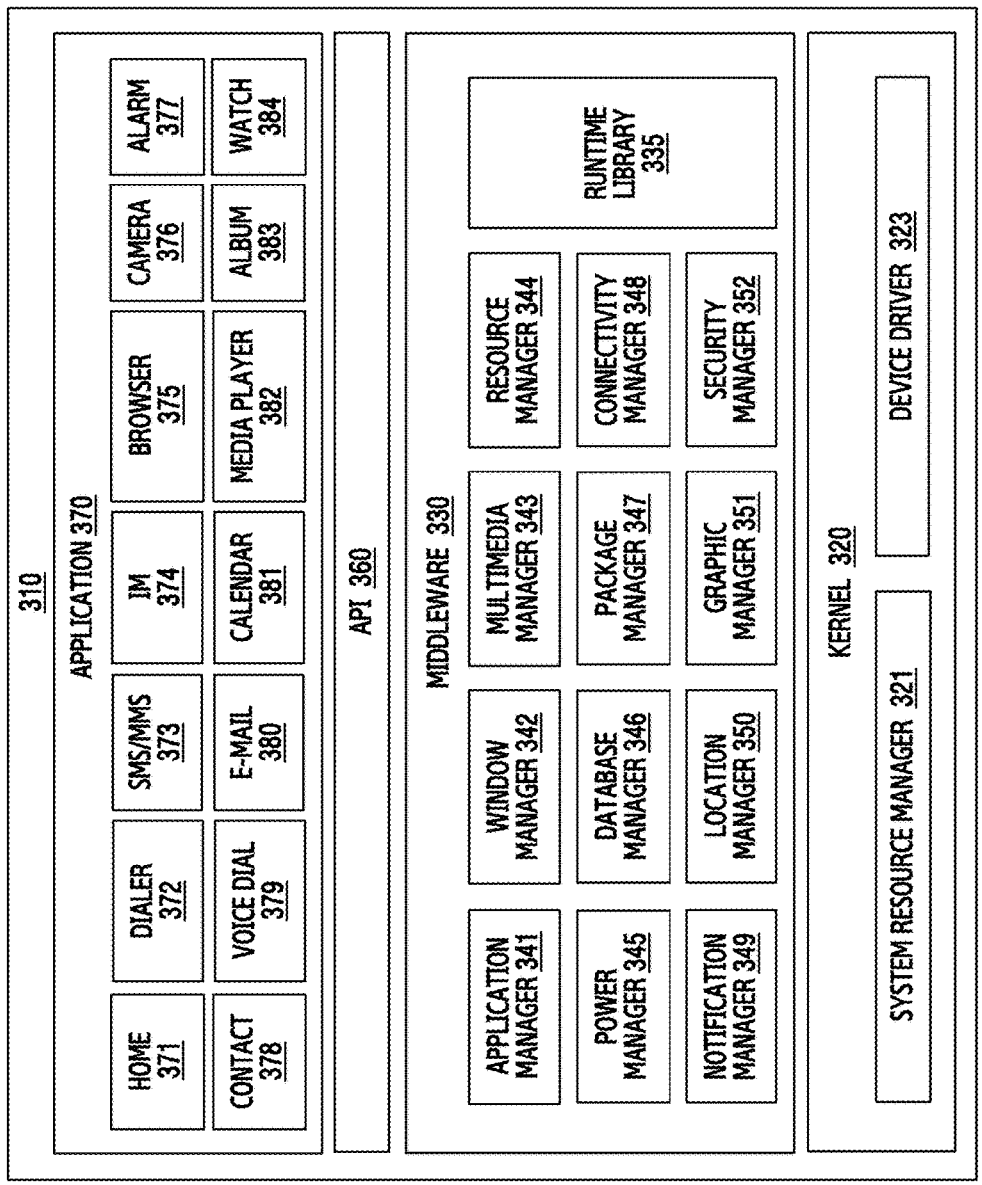
FIG. 3 is a block diagram of a program module according to various exemplary embodiments.

FIG. 3 is a block diagram 300 illustrating an example program module 310.

According to an example, the program module 310 (for example, the program 140) may include an Operation System (OS) for controlling resources related to an electronic device (for example, the electronic device 101) and/or various applications (for example, the application 147) driven on the OS. For example, the OS may be Android, iOS, Windows, Symbian, Tizen, Bada, or the like.

The program module 310 may include a kernel 320, middleware 330, an Application Programming Interface (API) 360, and/or an application 370. At least part of the program module 310 may be preloaded on the electronic device or downloaded from a server (for example, the server 106).

The kernel 320 (for example, the kernel 141 of FIG. 1) may include a system resource manager 321 or a device driver 323. The system resource manager 321 may control, allocate or collect the system resources. According to an example, the system resource manager 321 may include a process manager, a memory manager, a file system manager, and the like. The device driver 323 may include a display driver, a camera driver, a Bluetooth driver, a shared memory driver, a Universal Serial Bus (USB) driver, a keypad driver, a WiFi driver, an audio driver, or an Inter-Process Communication (IPC) driver, for example.

The middleware 330 may provide functions which are commonly required by the application 370 or may provide various functions to the application 370 through the API 360 such that the application 370 can effectively use limited system resources in the electronic device. According to an example, the middleware 330 (for example, the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and/or a security manager 352.

For example, the runtime library 335 may include a library module which is used by a compiler to add a new function through a programming language while the application 370 is executed. The runtime library 335 may perform functions on input/output management, memory management, an arithmetic function, and the like.

The application manager 341 may manage a life cycle of at least one of the applications 370, for example. The window manager 342 may manage GUI resources used in a screen. The multimedia manager 343 grasps a format necessary for reproducing various media files and encodes or decodes the media files by using a Codec suited to the corresponding format. The resource manager 344 may manage resources such as a source code, a memory, or a storage space of at least one of the applications 370.

The power manager 345 operates along with a Basic Input/Output System (BIOS) to manage a battery or power and provide power information necessary for operations of the electronic device. The database manager 346 may generate, search, or change a database which is used in at least one of the applications 370. The package manager 347 may manage installing or updating an application which is distributed in the form of a package file.

The connectivity manager 348 may manage wireless connection of WiFi, Bluetooth, and the like. The notification manager 349 may display or notify an event such as a message arrived, an appointment, a notification of proximity in such a manner that the event does not hinder the user. The location manager 350 may manage location information of the electronic device. The graphic manager 350 may manage a graphic effect to be provided to the user or a relevant user interface. The security manager 352 may provide an overall security function necessary for system security or user authentication. According to an exemplary embodiment, when the electronic device (for example, the electronic device 101) is equipped with a telephony function, the middleware 330 may further include a telephony manager (not shown) to manage a speech or video telephony function of the electronic device.

The middleware 330 may include a middleware module to form a combination of the various functions of the above-described elements. The middleware 330 may provide a module which is customized according to a kind of OS to provide a distinct function. The middleware 330 may dynamically delete some of the existing elements or may add new elements.

The API 360 (for example, the API 145) may, for example, be a set of API programming functions and may be provided as a different configuration according to an OS. For example, in the case of Android or IOS, a single API set may be provided for each platform. In the case of Tizen, two or more API sets may be provided.

The application 370 (for example, the application 147) may include one or more applications for providing functions, such as a home 371, a dialer 372, a a Short Message Service (SMS)/Multimedia Messaging Service (MMS) 373, an Instant Message (IM) 374, a browser 375, a camera 376, an alarm 377, a contact 378, a voice dial 379, an email 380, a calendar 381, a media player 382, an album 383, or a watch 384, or health care (for example, measuring exercise or a blood sugar), or providing environment information (for example, information on atmospheric pressure, humidity, or temperature), for example.

According to an example, the application 370 may include an application for supporting information exchange between the electronic device (for example, the electronic device 101A) and an external electronic device (for example, the electronic devices 102A, 104A) (hereinafter, referred to as an "information exchange application" for convenience of explanation). The information exchange application may include a notification relay application for relaying specific information to an external electronic device or a device management application for managing an external electronic device.

For example, the notification relay application may include a function to relay notification information generated by other applications of the electronic device (for example, the SMS/MMS application, the email application, the health care application, the environment information application, and the like) to an external electronic device (for example, the electronic device 102A, 104A). In addition, the notification relay application may receive notification information from an external electronic device and may relay the same to the user. For example, the device management application may manage (for example, install, delete or update) at least one function of an external electronic device (for example, the electronic device 104A) communicating with the electronic device (for example, turning on/off an external electronic device (or some parts) or adjusting brightness (or resolution) of a display), an application operating in the external electronic device or a service provided by the external electronic device (for example, a calling service or a message service).

According to an example, the application 370 may include an application (e.g., a health care application) that is specified according to an attribute of the external electronic device (e.g., the electronic device 102A, 104A). For example, an attribute of an electronic device indicating a kind of electronic device, which may be, for example, a mobile medical device. According to an example, the application 370 may include an application received from an external electronic device. For example, the application may be received from the server 106 or the electronic devices 102A, 104A. According to an example, the application 370 may include a preloaded application or a third party application which may be downloaded from a server. The names of the elements of the program module 310 according to the illustrated examples may be changed according to a kind of OS.

According to various examples, at least part of the program module 310 may be implemented by software, firmware, hardware, e.g., electronic circuitry, or a combination of two or more of them. At least part of the program module 310 may be implemented (for example, executed) by a processor (for example, the AP 210A). At least part of the program module 310 may include a module, a program, a routine, sets of instructions, or a process to perform one or more functions, for example.

Figure 4A:
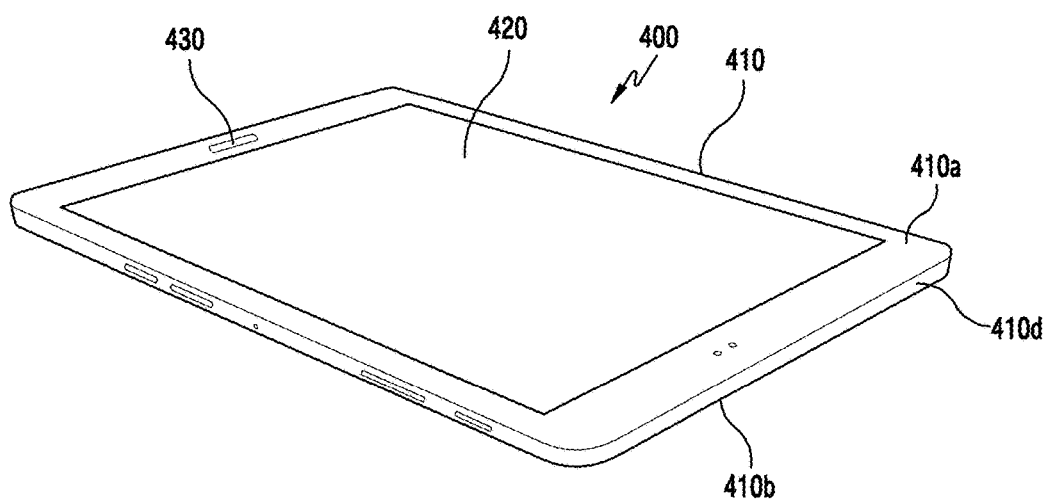
FIG. 4A is a perspective view illustrating a front surface of an electronic device according to various exemplary embodiments.
Figure 4B:
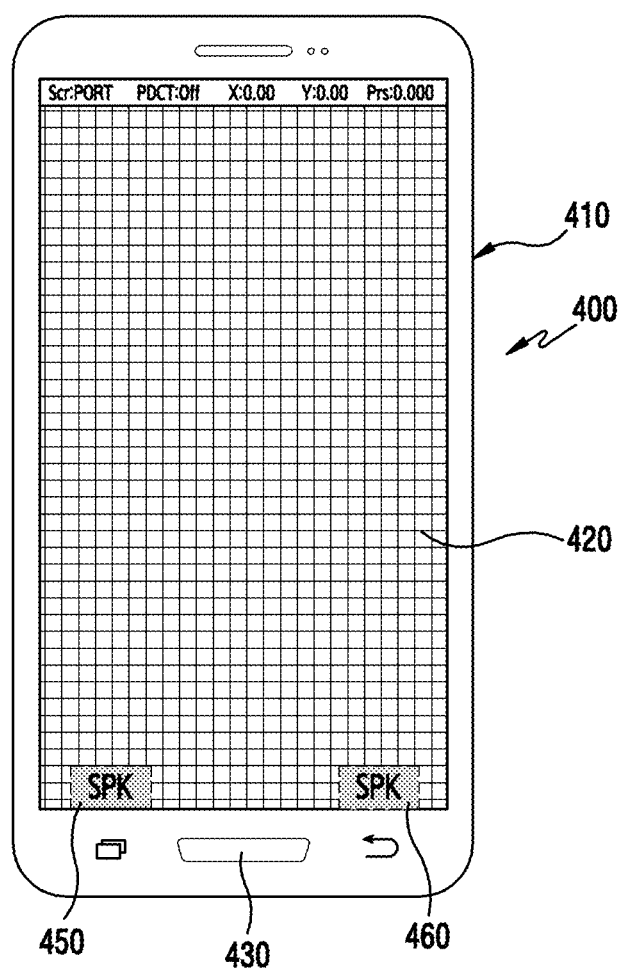
FIG. 4B is a plan view illustrating an arrangement state of first and second speakers mounted in an electronic device according to various exemplary embodiments.
Figure 4C:
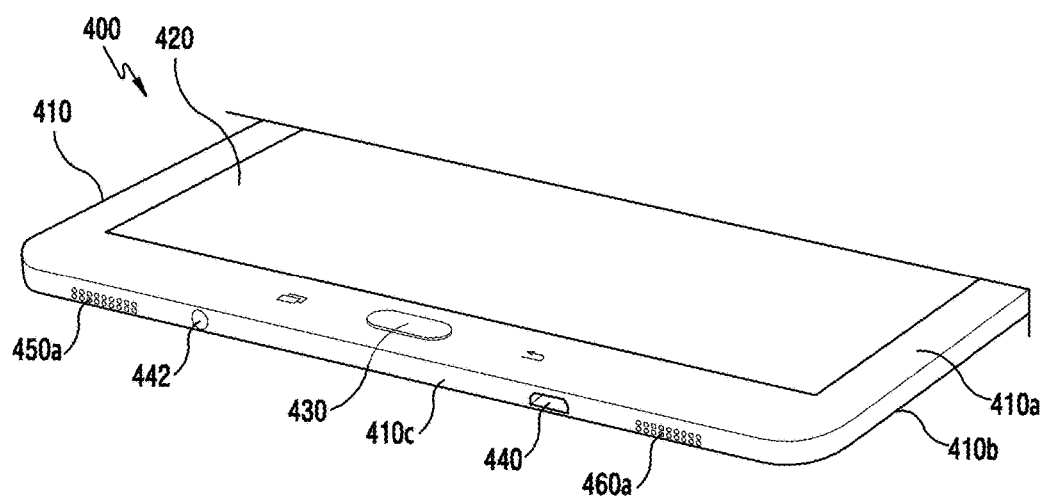
FIG. 4C is a perspective view illustrating a part of a lateral surface of an electronic device according to various exemplary embodiments.

FIG. 4A is a perspective view illustrating a front surface of an electronic device according to various exemplary embodiments. FIG. 4B is a plan view illustrating an arrangement state of at lease one or more speakers. For example, a first thin film speaker and a second thin film speaker may be mounted in the electronic device according to various exemplary embodiments. FIG. 4C is a perspective view illustrating a part of a lateral surface of the electronic device according to various exemplary embodiments.

Referring to FIG. 4A to FIG. 4C, the electronic device 400 according to various exemplary embodiments may arrange a touch screen display 420 at a front center of a housing 410 of the electronic device 400. The touch screen display 420 may be of a size that occupies the majority of the front surface of the electronic device 400. The touch screen display 420 according to various exemplary embodiments may display shortcut icons for running applications that are frequently used, a main menu change key, a time, a weather, etc. The main menu change key may display a menu screen on the touch screen display 420. Also, a status bar may be formed at an upper end of the touch screen display 420, to display a status of the electronic device 400 such as a battery charging state, a received signal strength and a current time as well. A home button 430, a menu button, and a reverse button may be formed at a lower part of the touch screen display 420. The home button 430 may be arranged in a rear surface 410b of the housing 410, not a front surface 410a of the housing 410.

The home button 430 according to various exemplary embodiments may, when actuated, display a main home screen on the touch screen display 420. For example, if the home key 430 is touched in a state where a home screen or menu screen that is different from the main home screen is displayed on the touch screen display 420, the main home screen may be displayed on the touch screen display 420. Also, the home button 430 may be used to display recently used applications on the touch screen display 420 or display a task manager on the touch screen display 420.

The menu button according to various exemplary embodiments may provide a connect menu that may be used on the touch screen display 420. The connect menu may include a widget add menu, a background screen change menu, a search menu, an editing menu, a setting menu, etc. The reverse button may display a screen that was executed just before a currently executed screen, or terminate the latest used application.

At least one or more sensors may be arranged at an edge of the touch screen display 420 in a front surface of the electronic device 400 according to various exemplary embodiments. Also, one pair of speaker sound holes 450a and 460a, a connection port 440 and an ear jack hole 442 may be arranged at a lower lateral surface of the electronic device 400 according to various exemplary embodiments.

The electronic device 400 according to various exemplary embodiments may include first and second speakers 450 and 460 that may be arranged substantially symmetrically at both sides of the home key 430 respectively. The respective speaker sound holes 450a and 460a are provided in a lateral surface 410c located close to the home key 430, for instance, a lateral surface located at a lower end of the housing 410 among lateral surfaces of the housing 410, and emit sound outward. However, the speaker sound holes 450a and 460a are not needed to be limited to being provided in the lateral surface located at the lower end of the housing 410, and may be provided in at least a part of the housing 410, for instance, an upper lateral surface 410d of the housing 410, the front surface 410a of the housing 410 or the rear surface 410b of the housing 410 in accordance with a speaker installation position and a duct structure.

Figure 5:
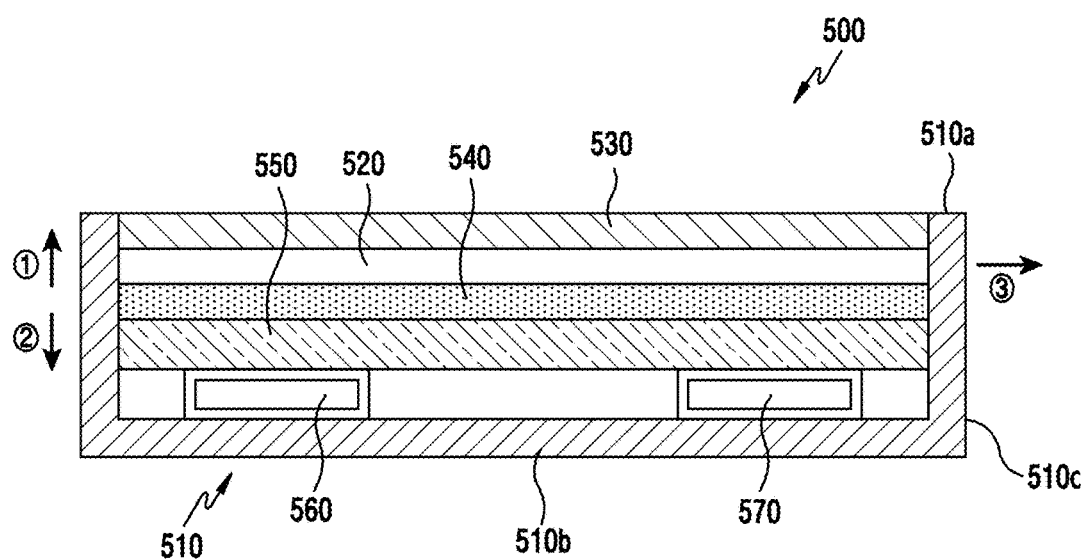
FIG. 5 is a sectional schematically illustrating a lamination state of first and second speakers arranged in an electronic device according to various exemplary embodiments.

FIG. 5 is a sectional view schematically illustrating a lamination state of first and second speakers arranged in an electronic device according to various exemplary embodiments. The illustrated first and second speakers may be first and second thin film speakers, respectively.

Referring to FIG. 5, the electronic device 500 according to various exemplary embodiments may include a housing 510 that houses and protects parts, and takes charge of an appearance. The housing 510 according to various exemplary embodiments may include a first surface 510a facing a first direction (①), a second surface 510b facing a second direction (②) that is a direction opposite to the first direction (①), and a third surface 510c between the first and second surfaces 510a and 510b, facing a third direction (③) that is vertical with each of the first and second directions (①, ②). In the drawing, the first direction (①) may be an up direction, and the second direction (②) may be a down direction, and the third direction (③) may be a lateral direction. The first surface 510a may be an upper surface, and the second surface 510b may be a lower surface, and the third surface 510c may be a lateral surface.

The housing 510 according to various exemplary embodiments may be arranged to expose a touch screen display 520 to the first surface 510a. The touch screen display 520 may be arranged between the first surface 510a of the housing 510 and the second surface 510b thereof, and may be arranged to overlap with the second surface 510b of the housing 510. For instance, the touch screen display 520 is a name inclusive of a touch sensor and a display. The display of the touch screen display 520 may include a Liquid Crystal Display (LCD) or an Organic Light Emitting Diode (OLED) display.

The electronic device 500 according to various exemplary embodiments may include a transparent substrate 530, for instance, a transparent window on the touch screen display 520. The electronic device 500 may arrange a digitizer 540 beneath the touch screen display 520. The electronic device 500 may include at least one or more speakers. The one or more speakers may each be for example, a thin film speaker 560 or 570 under the digitizer 540 that is supported by an internal support structure 550, for instance, a bracket. For example, the speaker may include the first and second thin film speakers 560 and 570. The thin film speakers may be made with piezoelectric materials, and may be made with opaque or transparent materials.

The first and second thin film speakers 560 and 570 may be arranged mutually side by side, without overlapping with each other. The first and second thin film speakers 560 and 570 each may be arranged in parallel with the housing 510. Also, the respective first and second thin film speakers 560 and 570 may be arranged in parallel in a state of facing at least a part of one surface of the housing 510, or may be attached integrally to the at least part of the one surface of the housing 510. The one surface of the housing 510 may be at least a part of an upper surface of the housing 510, or may be at least a part of a lower surface of the housing 510, or may be at least a part of a lateral surface of the housing 510.

The thin film speakers according to various exemplary embodiments may include a greater or less number of speakers. For example, the speakers may include the first and second thin film speakers 560 and 570, and one or three or more thin film speakers may be arranged. Also, the thin film speaker 560 or 570 according to various exemplary embodiments may emit sound to the front surface 510a of the housing 510 or the rear surface 510b thereof or the lateral surface 510c thereof respectively, in accordance with an arrangement position within the housing 510 or a duck structure formed within the housing 510.

Figure 6:
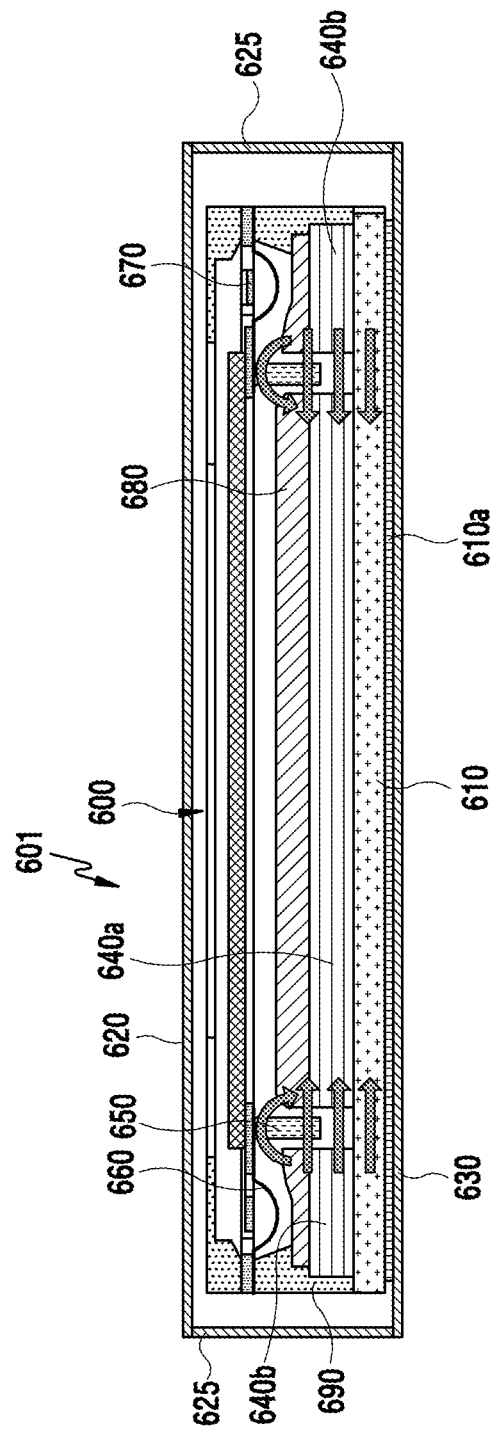
FIG. 6 is a section illustrating a construction of a speaker arranged in an electronic device according to various exemplary embodiments in which respective upper and lower speaker enclosures are made with nonmagnetic materials.

FIG. 6 is a section illustrating a construction of a thin film speaker arranged in an electronic device according to various exemplary embodiments, in which where respective upper and lower speaker enclosures are made with nonmagnetic materials.

Referring to FIG. 6, at least one or more thin film speakers 601 mounted in the electronic device according to various exemplary embodiments may be arranged within a housing of the electronic device. The thin film speaker 601 may include a speaker core 600 (i.e., a sound generating device) capable of emitting sound to the external through a separate sound duct structure. For example, at least one or more thin film speakers 601 or at least one or more pairs of thin film speakers 601 may be arranged within the housing. In FIG. 5, a construction of arranging one pair of thin film speakers, for instance, first and second thin film speakers 560 and 570 is illustrated.

The thin film speaker 601 according to various exemplary embodiments may include a yoke 610 on which the speaker core 600 arranged, and speaker enclosures 620, 625 and 630 protecting the speaker core 600. Reference numeral 620 may denote the speaker enclosure positioned over the speaker core 600, and reference numeral 630 may denote the speaker enclosure positioned under the speaker core 600, and reference numeral 625 may denote the speaker enclosures positioned next to the speaker core 600. To avoid obscuring the disclosure in unnecessary detail, only components of the upper and lower speaker enclosures related to the present disclosure will be described below.

The yoke 610 according to various exemplary embodiments, which is a support member that may support the speaker core 600, may be at least partially or wholly made with metallic materials. The yoke 610 may be installed using an elastic body 610a on a surface, which faces the first direction, of the lower speaker enclosure 630 described below.

The speaker core 600 according to various exemplary embodiments may include magnetic bodies, for example, inner and outer magnetic bodies 640a and 640b, a voice coil 650, a vibrator 660 (e.g., a diaphragm), and a suspension 670. The inner and outer magnetic bodies 640a and 640b are arranged on the yoke 610. The voice coil 650 is arranged between the inner and outer magnetic bodies 640a and 640b. The vibrator 660 is vibrated as an electric current is applied to the voice coil 650. The suspension 670 may connect with and support the diaphragm 660.

The speaker core 600 according to various exemplary embodiments may generate a magnetic flux between the inner and outer magnetic bodies 640a and 640b (i.e., generate the magnetic flux in a bolded arrow direction). The speaker core 600 may be configured such that the voice coil 650 is located in the magnetic flux. In this state, if an electric current is applied to the voice coil 650, the diaphragm 660 may vibrates up/down to generate sound. The speaker core 600 may be configured such that the sound generated in the diaphragm 660 is reflected from an upper iron 680 and is emitted out of a sound discharge hole via a sound duct structure.

The speaker enclosure according to various exemplary embodiments may include the upper speaker enclosure 620 that surrounds and protects an upper part of the speaker core 600, and the lower speaker enclosure 630 that surrounds a lower part of the speaker core 600 and confronts the upper speaker enclosure 620. The thin film speaker 601 may be protected and supported by the upper, lower and lateral speaker enclosures 620, 630 and 625. For instance, the upper and lower speaker enclosures 620 and 630 may be made with nonmagnetic materials, to protect the speaker core 600. The nonmagnetic materials, for example, stainless materials (SUS304), may contain alloy materials that mix pure iron with approximately 18% chromes and approximately 8% nickels.

Reference numeral 690 may denote a casing frame that protects the speaker core 600, and reference numeral 610a may denote a speaker core absorber (i.e., the elastic body).

According to various exemplary embodiments, though not illustrated, the enclosure, for example, the lateral speaker enclosure 625 may be adhered seamlessly to the casing frame 690 that protects the speaker core 600. According to various exemplary embodiments, for example, the casing frame 690 may replace the enclosure, for example, at least a partial region of the lateral speaker enclosure 625.

Figure 7:
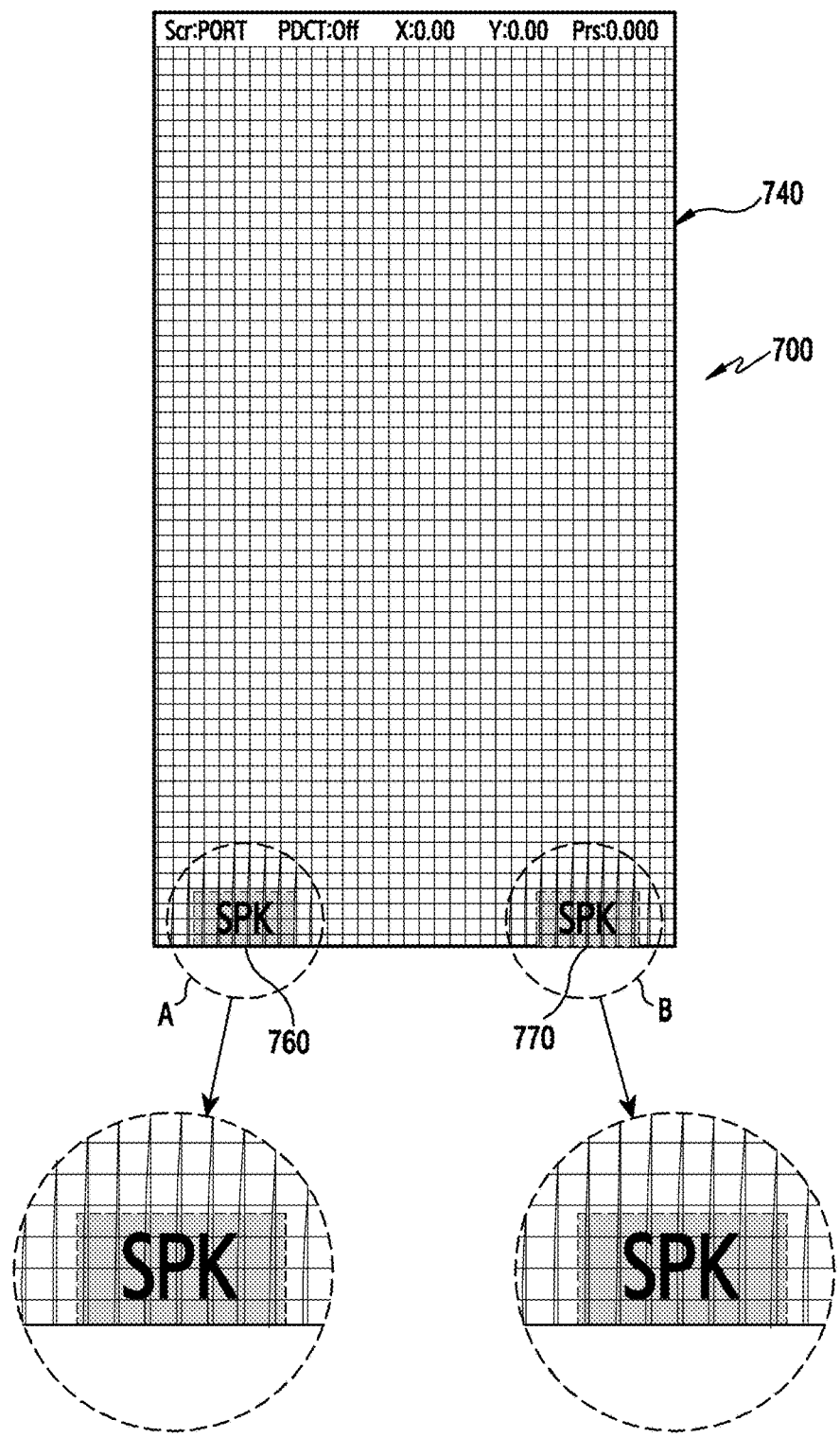
FIG. 7 is a diagram illustrating a bending phenomenon takes place due to first and second speakers not having a magnetic flux shielding structure in an electronic device according to various exemplary embodiments.

FIG. 7 is a diagram illustrating that a bending phenomenon takes place due to first and second thin film speakers 760 and 770 not having a magnetic flux shielding structure in an electronic device according to various exemplary embodiments.

Referring to FIG. 7, if a digitizer 740 is arranged beneath a touch screen display, the following problems may occur when the electronic device 700 according to various exemplary embodiments does not shield each of the first and second thin film speakers 760 and 770 installed within a housing of the electronic device 700.

The first and second thin film speakers 760 and 770 may each include inner and outer magnetic bodies (referring to FIG. 6). The inner and outer magnetic bodies may affect peripheral parts. In detail, the magnetic force of these inner and outer magnetic bodies may result in a phenomenon of bending imaginary straight lines which are drawn in each of partial regions (A and B) of the digitizer 740 around the installed first and second thin film speakers 760 and 770. The bending phenomenon may increasingly get serious as it gets closer to each of the first and second thin film speakers 760 and 770.

To inhibit this bending phenomenon, the electronic device 700 having the digitizer 740 according to various exemplary embodiments may require a structure of shielding magnetic fluxes of the thin film speakers 760 and 770.

Figure 8:
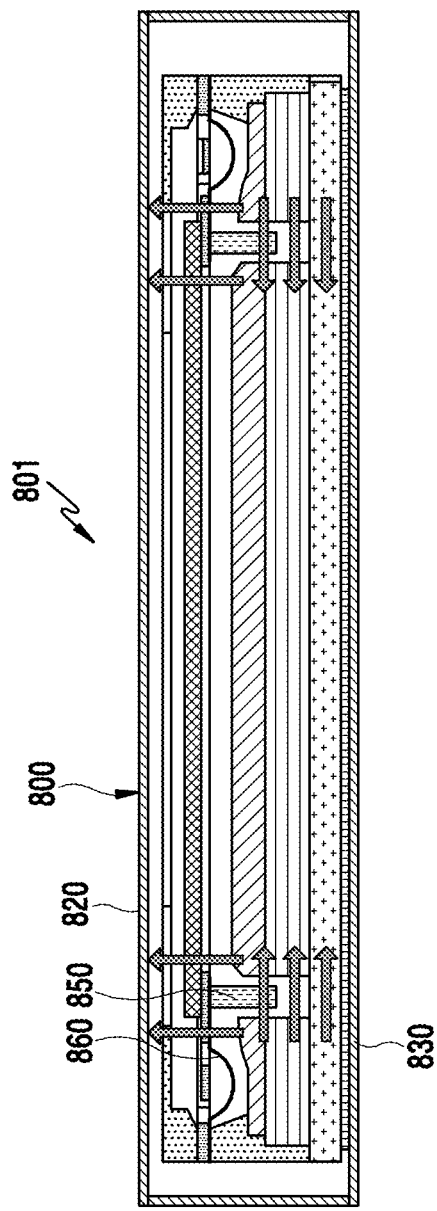
FIG. 8 is a sectional view illustrating a construction of a speaker arranged in an electronic device according to various exemplary embodiments, in which an upper speaker enclosure is made with magnetic materials and a lower speaker enclosure is made with nonmagnetic materials.

FIG. 8 is a sectional view illustrating a construction of a thin film speaker arranged in an electronic device according to various exemplary embodiments, in which an upper speaker enclosure is made with magnetic materials and a lower speaker enclosure is made with nonmagnetic materials. The magnetic material may be, for example, material having a great corrosiveness and not containing chrome and nickel components compared with the nonmagnetic material. An outer surface of the magnetic material may be plated for use.

Referring to FIG. 8, to improve the bending phenomenon illustrated in FIG. 7, in the thin film speaker 801 according to various exemplary embodiments, an upper speaker enclosure 820 may include or be formed at least partially from magnetic materials, and a lower speaker enclosure 830 may be made with nonmagnetic materials. The upper speaker enclosure 820 made with the magnetic materials may shield the thin film speaker 801 from a magnetic flux of the thin film speaker 801.

However, this magnetic flux shielding structure of the thin film speaker 801 may decrease a magnetic flux density (B) that is applied to a voice coil 850. Here, the unit (the International System of units (SI)) of the magnetic flux density (B) is Tesla (T) or Weber (Wb/m2). The magnetic flux density (B) has a relationship of B=μH between a magnetic field strength (H) and a magnetic permeability (μ). The decreased magnetic flux density (B) may weaken the vibration of a diaphragm 860, causing a deterioration of a maximum sound pressure of the thin film speaker 801.

The magnetic flux shielding structure of the electronic device with the thin film speaker according to various exemplary embodiments of the present disclosure will be described below with reference to the accompanying drawings.

Figure 9:
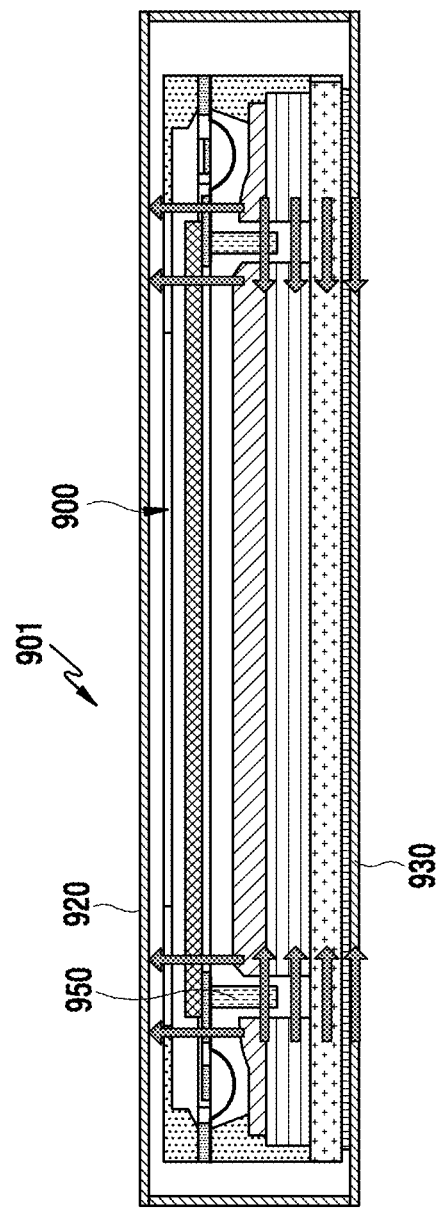
FIG. 9 is a sectional view illustrating a construction of a speaker arranged in an electronic device according to various exemplary embodiments of the present disclosure, in which respective upper and lower speaker enclosures are made with magnetic materials.

FIG. 9 is a section illustrating a construction of a thin film speaker arranged in an electronic device according to various exemplary embodiments of the present disclosure, in which respective upper and lower speaker enclosures are made with magnetic materials.

Referring to FIG. 9, only a difference of the thin film speaker 901 according to various exemplary embodiments compared with the thin film speaker 801 of FIG. 8 will be described, and a detailed description of the same construction will be omitted to avoiding obscuring the present disclosure in unnecessary detail.

In the thin film speaker 901 according to various exemplary embodiments, only components of upper and lower speaker enclosures 920 and 930 are different from those of the thin film speaker 801 of FIG. 8, and the remnant constructions. For instance, a yoke and a speaker core 900 may include inner and outer magnetic bodies, a voice coil 950, a diaphragm and a suspension are the same as those of the thin film speaker 801 of FIG. 8 and therefore, a description thereof will be omitted.

The thin film speaker 901 according to various exemplary embodiments may include the upper speaker enclosure 920 made with magnetic materials, and the lower speaker enclosure 930 made with magnetic materials and arranged to face the upper speaker enclosure 920. By the upper and lower speaker enclosures 920 and 930 made with the magnetic materials, the thin film speaker 901 according to various exemplary embodiments may shield a magnetic flux generated in the thin film speaker 901.

For instance, some magnetic fluxes may be lost at a voice coil 950 portion due to the upper speaker enclosure 920 made with magnetic materials. To compensate for this, the lower speaker enclosure 930 may include or be at least partially formed from magnetic materials, thereby inhibiting a leakage of the magnetic flux and compensate a partial magnetic flux density having been lost in the upper speaker enclosure 920 and minimizing a decrease of a sound pressure generated in the thin film speaker 901.

As the upper and lower speaker enclosures 920 and 930 increase in thickness, the respective upper and lower speaker enclosures 920 and 930 may provide a greater magnetic flux shielding effect.

The respective upper and lower speaker enclosures 920 and 930 according to various exemplary embodiments may be configured to have the same thickness, or may be configured to have different thicknesses from one another. The thicknesses of the upper and lower speaker enclosures 920 and 930 may be determined considering that, as the upper and lower speaker enclosures 920 and 930 increase in thickness, the magnetic flux shielding effect may work better and a partial magnetic flux density may be lost.

When the upper speaker enclosure 920 is installed in at least a part of a bracket, the upper speaker enclosure 920 may be manufactured integrally with the bracket made with the magnetic materials. When the lower speaker enclosure 930 is mounted in at least a part of a metal housing, the lower speaker enclosure 930 may be manufactured integrally with the at least part of the metal housing.

In the thin film speaker 901 according to various exemplary embodiments, the lower speaker enclosure 930 made with the magnetic materials may be made with materials having a relatively equal or greater magnetic intensity compared with the upper speaker enclosure 920 made with the magnetic materials. According to one exemplary embodiment, the magnetic intensity may increase in proportion to the purity or content ratio of pure iron.

In the thin film speaker 901 according to various exemplary embodiments, the lower speaker enclosure 930 made with the magnetic materials may be configured to have relatively equal or greater physical thickness, compared with the upper speaker enclosure 920 made with the magnetic materials.

Figure 10:
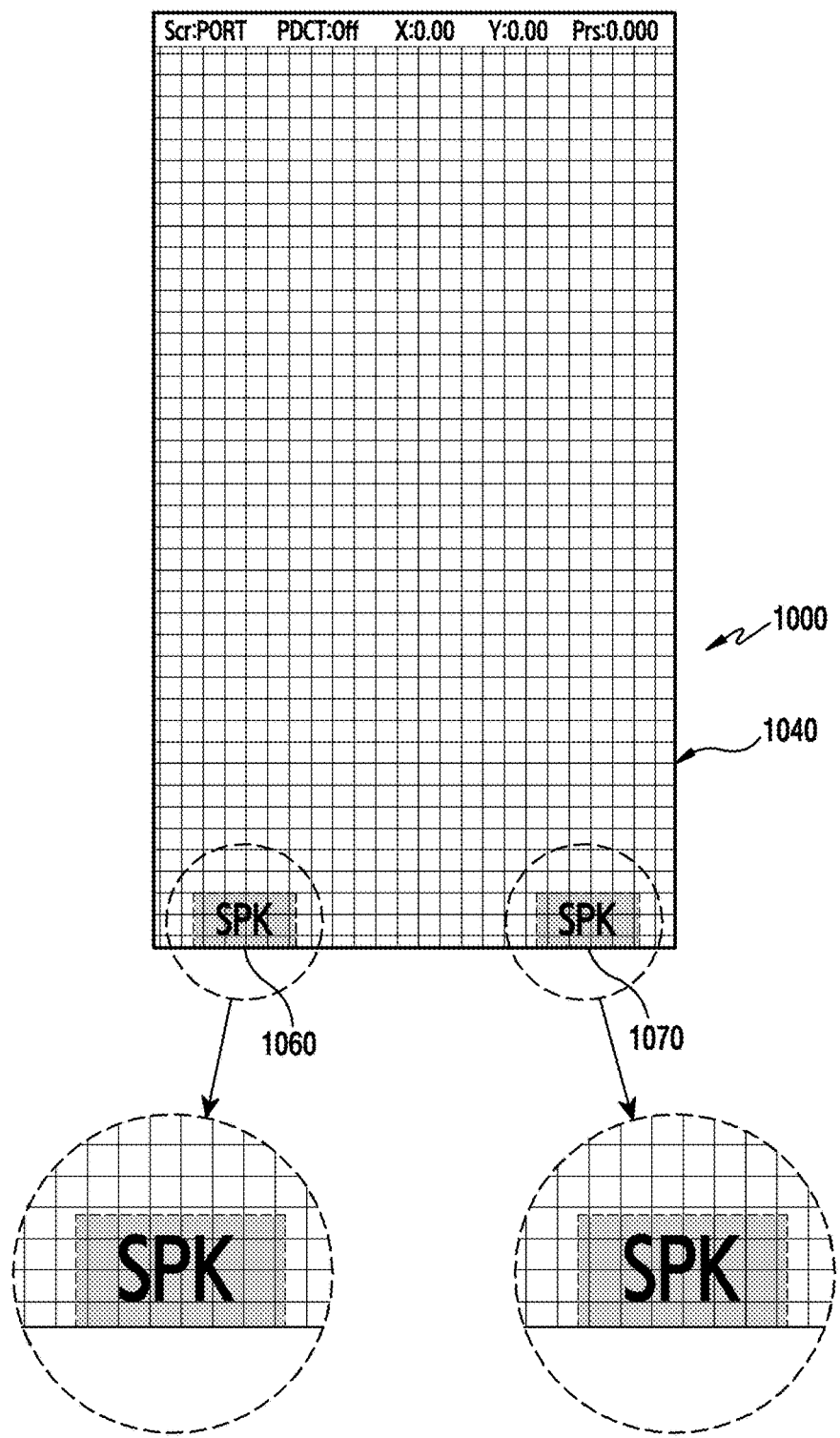
FIG. 10 is a diagram illustrating first and second speakers having a magnetic flux shielding structure in an electronic device according to various exemplary embodiments of the present disclosure.

FIG. 10 is a diagram illustrating first and second speakers having a magnetic flux shielding structure in an electronic device according to various exemplary embodiments of the present disclosure.

Referring to FIG. 10, if a digitizer 1040 is arranged beneath a touch screen display, the electronic device 1000 according to various exemplary embodiments may shield at least one or more speakers from a magnetic flux. For example, the first and second thin film speakers 1060 and 1070 installed within a housing may be shielded from the magnetic flux. As mentioned in FIG. 9, the upper and lower speaker enclosures 920 and 930 are made with magnetic materials respectively, the upper and lower speaker enclosures 920 and 930 may shield a magnetic flux generated in inner and outer magnetic bodies of a speaker core.

The first and second thin film speakers 1060 and 1070 may each include inner and outer magnetic bodies, so the inner and outer magnetic bodies may have the influence of magnetic flux on peripheral parts, which may include for instance, the digitizer 1040. The electronic device 1000 may shield the respective first and second thin film speakers 1060 and 1070 from the magnetic fluxes generated in the inner and outer magnetic bodies of the speaker core, thereby preventing a bending phenomenon that the magnetic flux bring about in the digitizer 1040.

Figure 11:
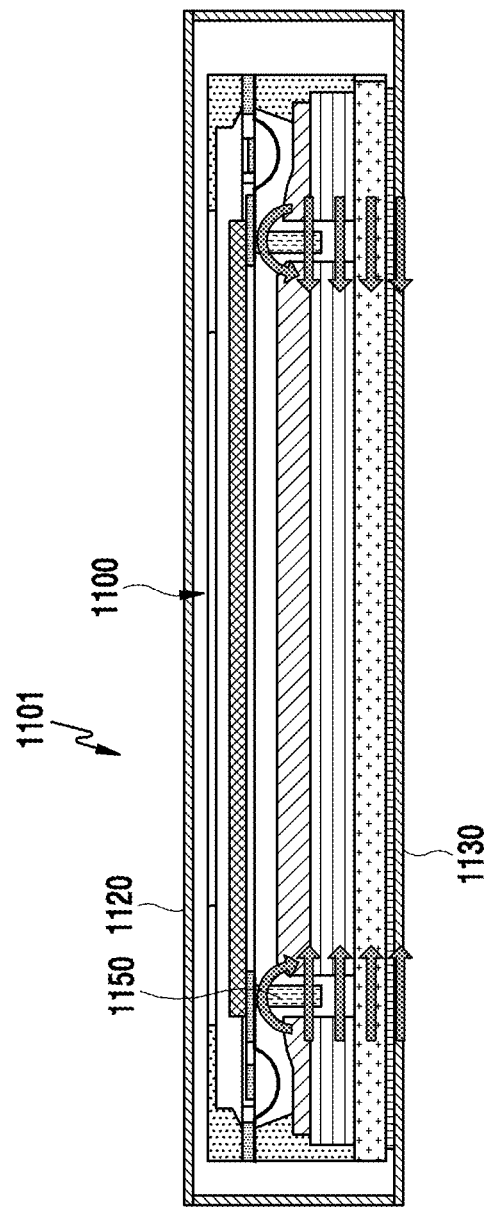
FIG. 11 is a section illustrating a construction of a speaker arranged in an electronic device according to various exemplary embodiments of the present disclosure, in which an upper speaker enclosure is made with nonmagnetic materials and a lower speaker enclosure is made with magnetic materials.

FIG. 11 is a section illustrating a construction of a thin film speaker arranged in an electronic device according to various exemplary embodiments, in which an upper speaker enclosure is made with nonmagnetic materials and a lower speaker enclosure is made with magnetic materials.

Referring to FIG. 11, only a difference of the thin film speaker 1101 according to various exemplary embodiments compared with the thin film speaker 901 of FIG. 9 will be described, and a detailed description of the same construction will be omitted to avoid obscuring the present application in unnecessary detail.

In the thin film speaker 1101 according to various exemplary embodiments, only components of upper and lower speaker enclosures 1120 and 1130 are different from those of the thin film speaker 901 of FIG. 9, and the remnant construction. For instance, a construction of a speaker core 1100 is the same as that of the thin film speaker 901 of FIG. 9 and therefore, a description thereof will be omitted to avoid obscuring the present disclosure in unnecessary detail.

The thin film speaker 1101 according to various exemplary embodiments may include the upper speaker enclosure 1120 that is made with the nonmagnetic materials, and the lower speaker enclosure 1130 that is made with the magnetic materials and is arranged to face the upper speaker enclosure 1120.

In a case where the electronic device according to various exemplary embodiments does not need to shield a magnetic flux generated in a speaker core 1100 because the electronic device is not equipped with a part such as a digitizer, the upper speaker enclosure 1120 may be made with the nonmagnetic materials. The lower speaker enclosure 1130 may shield a leaked magnetic flux, thereby increasing a magnetic flux density generated in a voice coil 1150 and thus achieving the result of increasing a sound pressure generated in the thin film speaker 1101.

For example, as the lower speaker enclosure 1130 increases in thickness, the lower speaker enclosure 1130 an extent to which a magnetic field is leaked may correspondingly decrease and an internal magnetic flux density may correspondingly increase, thereby achieving the result of increasing a sound pressure generated in the thin film speaker 1101.

The respective upper and lower speaker enclosures 1120 and 1130 according to various exemplary embodiments may be configured to have the same thickness, or may be configured to have different thicknesses respectively. As the lower speaker enclosure 1130 increases in thickness, a magnetic flux shielding effect may work better.

Figure 12:
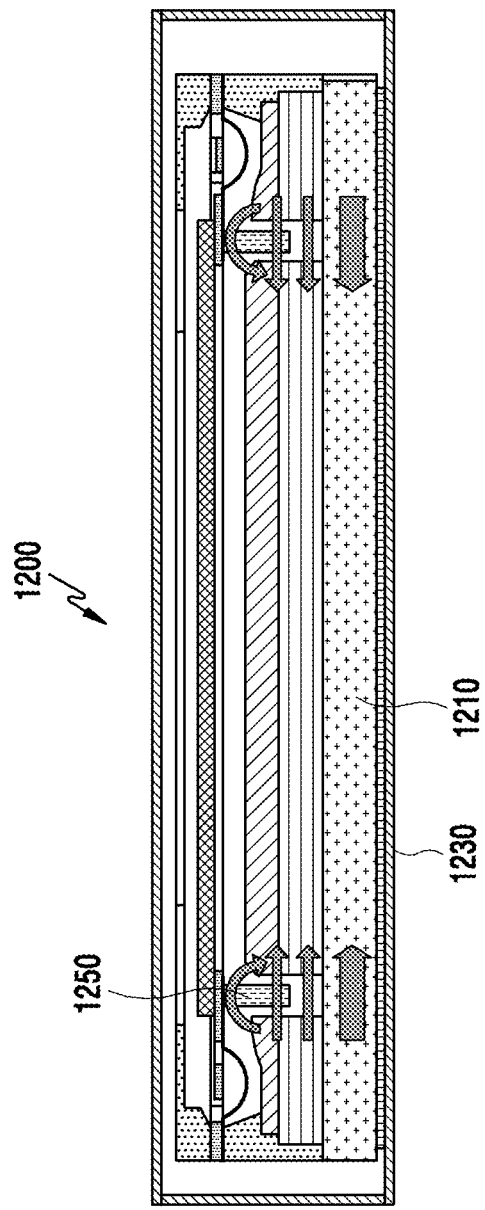
FIG. 12 is a section illustrating a construction of a speaker arranged in an electronic device according to various exemplary embodiments of the present disclosure, in which upper and lower speaker enclosures are made with nonmagnetic materials respectively and yokes are configured to have greater thicknesses compared to the conventional art.

FIG. 12 is a section illustrating a construction of a thin film speaker arranged in an electronic device according to various exemplary embodiments, and is an example diagram illustrating a state in which upper and lower speaker enclosures are made with nonmagnetic materials respectively and a yoke is configured to have a greater thickness compared to the conventional art.

Referring to FIG. 12, only a difference of the thin film speaker 1200 according to various exemplary embodiments compared with the thin film speaker 601 of FIG. 6 will be described, and a detailed description of the same construction will be omitted.

The thin film speaker 1200 according to various exemplary embodiments may be configured to have the yoke 1210 having a greater thickness than the yoke 610 of the thin film speaker 601 illustrated in FIG. 6. For instance, the yoke 1210 may be made with magnetic materials and configured thicker than the conventional art, thereby shielding a leaked magnetic field. If the yoke 1210 shields the magnetic field leaked into the lower speaker enclosure 1230, the thin film speaker 1200 may increase a magnetic flux density generated in a voice coil 1250 and thus achieve the result of increasing a sound pressure generated in the thin film speaker 1200.

Figure 13:
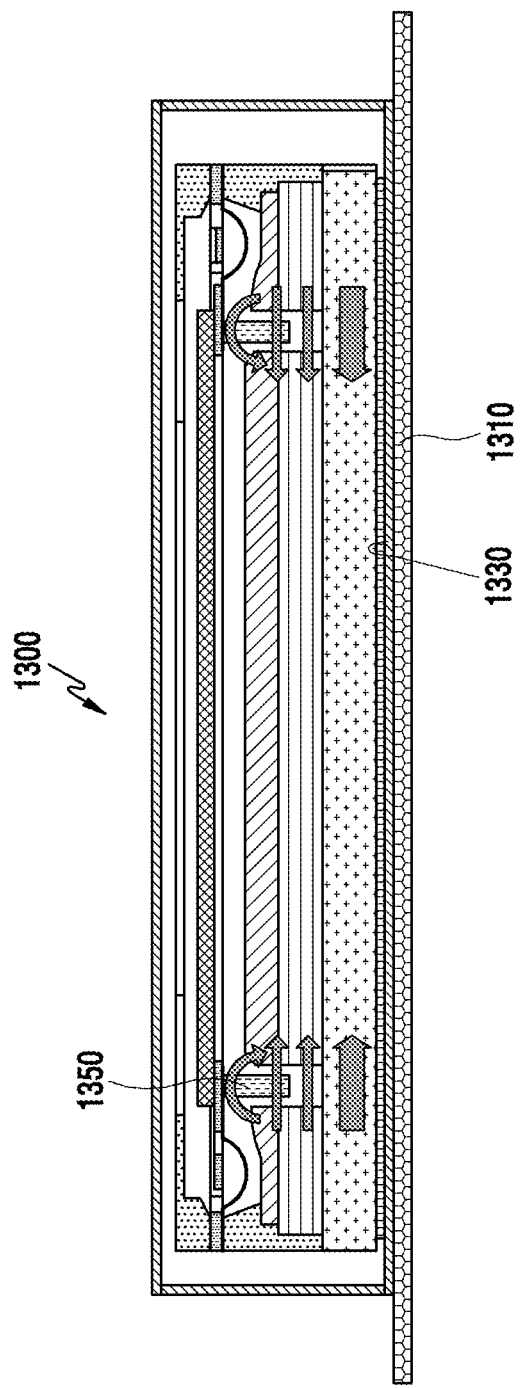
FIG. 13 is a section illustrating a construction of a speaker arranged in an electronic device according to various exemplary embodiments of the present disclosure, in which a lower speaker enclosure is arranged to overlap with at least a part of a housing such that the at least part of the housing performs a magnetic flux shielding function.

FIG. 13 is a section illustrating a construction of a thin film speaker arranged in an electronic device according to various exemplary embodiments, and is an example diagram illustrating a state in which a lower speaker enclosure is arranged to overlap with at least a part of a housing such that the at least part of the housing performs a magnetic flux shielding function.

Referring to FIG. 13, only a difference of the thin film speaker 1300 according to various exemplary embodiments compared with the thin film speaker 601 of FIG. 6 will be described, and a detailed description of the same construction will be omitted to avoid obscuring the present application in unnecessary detail.

The thin film speaker 1300 according to various exemplary embodiments may be configured to have a structure in which the lower speaker enclosure 1330 made with nonmagnetic materials is installed in at least a part of a housing 1310 made with magnetic materials and thus the at least part of the housing 1310 shields a magnetic flux. For example, the housing 1310 may shields a magnetic field leaked into the lower speaker enclosure 1330, thereby increasing a magnetic flux density generated in a voice coil 1350 which results in an increase of a sound pressure generated in the thin film speaker 1300.

For example, the at least part of the housing 1310 may be made with metallic materials, and the at least part of the housing 1310 may become at least a part of an upper surface of the housing 1310 or become at least a part of a lower surface of the housing 1310 or become at least a part of a lateral surface of the housing 1310. As the housing 1310 is greater in thickness, a magnetic flux shielding effect may work better.

Figure 14:
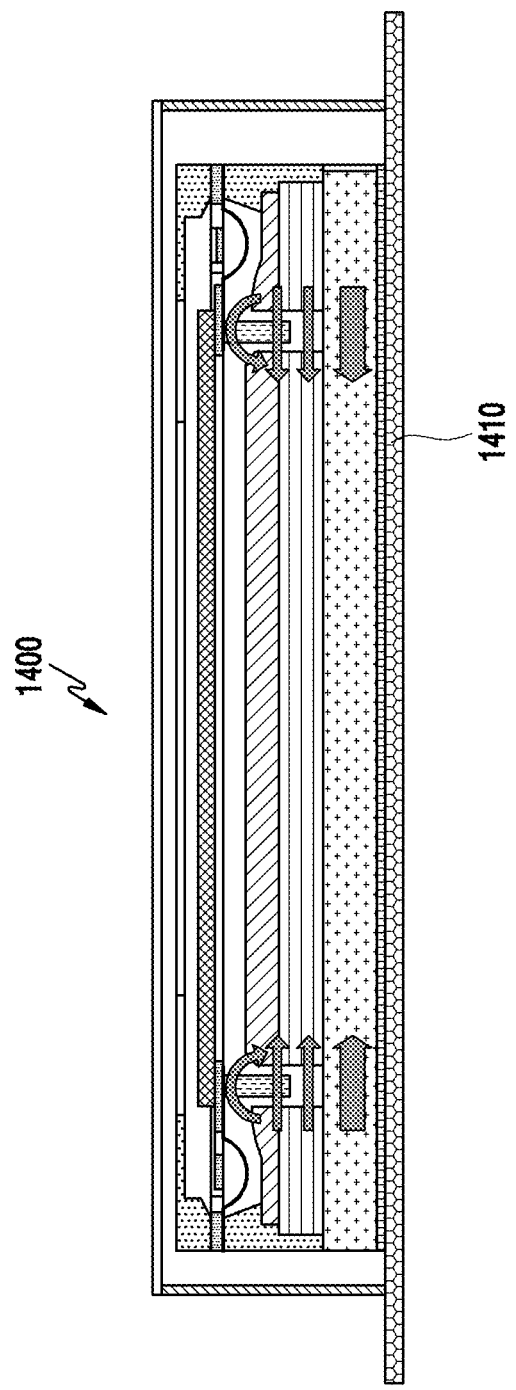
FIG. 14 is a section illustrating a construction of a speaker arranged in an electronic device according to various exemplary embodiments of the present disclosure in which a lower speaker enclosure is eliminated and instead at least a part of a housing performs a magnetic flux shielding function.

FIG. 14 is a sectional view illustrating a construction of a thin film speaker arranged in an electronic device according to various exemplary embodiments of the present disclosure in which a lower speaker enclosure is eliminated and instead at least a part of a housing performs a magnetic flux shielding function.

Referring to FIG. 14, only a difference of the thin film speaker 1400 according to various exemplary embodiments compared with the thin film speaker 1300 of FIG. 13 will be described, and a detailed description of the same construction will be omitted.

The thin film speaker 1400 according to various exemplary embodiments may be configured to have a structure in which a lower speaker enclosure (not shown) of nonmagnetic materials is eliminated and instead is replaced with at least a part of a housing 1410 of magnetic materials and thus the at least part of the housing 1410 shields a magnetic flux. For example, the at least part of the housing 1410 shields a leaked magnetic field, thereby increasing a magnetic flux density generated in a voice coil and thus achieving the result of increasing a sound pressure generated in the thin film speaker 1400.

For instance, the at least part of the housing 1410 may include metallic materials. And, the at least part of the housing 1410 may become at least a part of an upper surface of the housing 1410 or become at least a part of a lower surface of the housing 1410 or become at least a part of a lateral surface of the housing 1410. As the housing 1410 increases in thickness, a magnetic flux shielding effect may work better.

An electronic device according to various exemplary embodiments of the present disclosure may include a housing comprising a first surface facing a first direction, a second surface facing a second direction that is a direction opposite to the first direction, and a third surface existing between the first and second surfaces and facing a third direction that is vertical with each of the first and second directions, at least one or more speakers arranged in at least a part of the housing, and a speaker enclosure protecting the speaker. The speaker enclosure may include an upper speaker enclosure arranged to face the first surface that faces the first direction, and a lower speaker enclosure arranged to face the second surface that faces the second direction, and confronting the upper speaker enclosure. The respective upper and lower speaker enclosures may be at least partially made with magnetic materials respectively, to shield a magnetic flux generated in the speaker.

The speaker according to various exemplary embodiments of the present disclosure may include a first speaker and a second speaker that are arranged approximately symmetrically at both sides of a home key respectively when viewing from the front of the electronic device. The respective first and second speakers may emit sound toward the third surface of the housing of the electronic device respectively.

The upper speaker enclosure according to various exemplary embodiments of the present disclosure may be supported by an internal support structure of the electronic device. The internal support structure may at least partially include metallic materials.

The lower speaker enclosure according to various exemplary embodiments of the present disclosure may be mounted on at least a part of the housing of magnetic materials.

The respective upper and lower speaker enclosures according to various exemplary embodiments of the present disclosure may be configured to have the same thickness or different thicknesses.

The first speaker and the second speaker according to various exemplary embodiments of the present disclosure may be arranged side by side, without overlapping with each other.

The electronic device according to various exemplary embodiments of the present disclosure may further include a digitizer arranged to be spaced apart in parallel over the first and second speakers, and a touch screen display arranged on the digitizer.

An electronic device according to various exemplary embodiments of the present disclosure may include a housing comprising a first surface facing a first direction, a second surface facing a second direction that is a direction opposite to the first direction, and a third surface existing between the first and second surfaces and facing a third direction that is vertical with each of the first and second directions, at least one or more speakers arranged in at least a part of the housing, to emit sound in the third direction, and a speaker enclosure protecting the speaker. The speaker enclosure may include an upper speaker enclosure arranged to face the first surface that faces the first direction, and a lower speaker enclosure arranged to face the second surface that faces the second direction, and confronting the upper speaker enclosure. The upper speaker enclosure may be made with nonmagnetic materials, and the lower speaker enclosure may be at least partially made with magnetic materials.

As the lower speaker enclosure according to various exemplary embodiments of the present disclosure increases in thickness, the lower speaker enclosure may more decrease a leakage magnetic field, to increase a sound pressure generated in the speaker.

An electronic device according to various exemplary embodiments of the present disclosure may include a housing comprising a first surface facing a first direction, a second surface facing a second direction that is a direction opposite to the first direction, and a third surface existing between the first and second surfaces and facing a third direction that is vertical with each of the first and second directions, at least one or more speakers arranged in at least a part of the housing, and emitting sound in the third direction, and a speaker enclosure protecting the speaker. The speaker enclosure may include an upper speaker enclosure arranged to face the first surface that faces the first direction, and a lower speaker enclosure arranged to face the second surface that faces the second direction, and confronting the upper speaker enclosure. The upper and lower speaker enclosures may be made with nonmagnetic materials respectively, and the lower speaker enclosure may be arranged to overlap with at least a part of the housing of magnetic materials of the electronic device.

The housing of the magnetic materials according to various exemplary embodiments of the present disclosure may shield a magnetic flux generated in the speaker.

The lower speaker enclosure according to various exemplary embodiments of the present disclosure may be attached to the at least part of the housing.

The speaker according to various exemplary embodiments of the present disclosure may be supported by a yoke of metallic materials within the electronic device, and the yoke may be a structure in which, as the yoke increases in thickness, it is advantageous in shielding a magnetic field generated in the speaker.

The housing according to various exemplary embodiments of the present disclosure may be of metallic materials, and may be a structure in which as the housing increases in thickness, it is advantageous in magnetic flux shielding.

The lower speaker enclosure and the housing according to various exemplary embodiments of the present disclosure are available to be manufactured as one piece.

The computer-readable recording media can include a magnetic media such as a hard disk, a floppy disk and a magnetic tape, an optical media such as a Compact Disc-Read Only Memory (CD-ROM) and a Digital Versatile Disc (DVD), a Magneto-Optical Media such as a floptical disk, and a hardware device that is specially configured to store and perform a program instruction (e.g., the program module) such as a Read Only Memory (ROM), a Random Access Memory (RAM), a flash memory, etc. Also, a program command can include not merely a mechanical language code such as a code made by a compiler, but also a high-level language code that is executable by a computer using an interpreter, etc. The aforementioned hardware device may be configured to operate as one or more software modules so as to perform operations of the present disclosure, and vice versa.

The module or program module according to the present disclosure may further include at least one or more of the aforementioned constituent elements, or omit some of the aforementioned constituent elements, or further include additional other constituent elements. Operations carried out by the module, the program module or the other constituent elements according to the present disclosure may be executed in a sequential, parallel, repeated or heuristic method. Also, some operations may be executed in another order or be omitted, or another operation may be added.

Various exemplary embodiments of the present disclosure disclosed in the present specification and drawings are to only suggest specific examples so as to easily explain the technological content of the present disclosure and help the understanding of the present disclosure, and do not intend to limit the scope of the present disclosure. Accordingly, the scope of the present disclosure should be construed as including all modified or changed forms drawn on the basis of the technological spirit of the present disclosure besides the exemplary embodiments disclosed herein.

According to the present disclosure, an electronic device with a speaker in need of magnetic force shielding may compensate a magnetic flux density having been lost due to the magnetic force shielding, thereby preventing a decrease of a sound pressure generated in the speaker.

Also, according to the present disclosure, an electronic device with a speaker not in need of magnetic force shielding may increase an intensity of a magnetic flux density, thereby increasing a sound pressure generated in the speaker.

While the disclosure has been shown and described with reference to certain preferred embodiments thereof, it will be understood by those skilled in the art that various changes in form and details may be made therein without departing from the spirit and scope of the disclosure as defined by the appended claims.

What is claimed is:

1. An electronic device comprising:
   a housing including a first surface facing in a first direction, a second surface facing in a second direction opposite to the first direction, and a side surface that at least partially surrounds a space between the first surface and the second surface;
   a touch screen display between the first surface and the second surface, and at least partially exposed through the first surface; and
   at least one speaker arranged in the housing,
   wherein the speaker includes a speaker enclosure comprising:
      an upper speaker enclosure arranged to face the first surface; and
      a lower speaker enclosure arranged to face the second surface, and confronting the upper speaker enclosure,
   wherein the upper and lower speaker enclosures are at least partially made with magnetic materials that shield a magnetic flux generated in the speaker,
   wherein the magnetic materials compensate a magnetic flux density lost in the speaker enclosure so as to prevent a decrease of a sound pressure generated in the speaker,
   wherein the speaker is disposed between the touch screen display and the second surface while aligning to speaker holes formed on the side surface, and
   wherein the speaker includes a thin film speaker, the thin film speaker comprising:
      a support member coupled to a surface of the lower speaker enclosure facing the upper speaker enclosure between the upper speaker enclosure and the lower speaker enclosure;
      an elastic member disposed between the support member and the surface of the low speaker enclosure; and
      a speaker core disposed on the support member between the support member and the upper speaker enclosure;
   wherein the speaker core includes:
      inner and outer magnetic bodies disposed on the support member between the support member and the upper speaker enclosure, wherein the inner magnetic body is surrounded by the outer magnetic body when viewed from above the first surface;
      a diaphragm located between the outer magnetic body and the upper speaker enclosure;
      a voice coil disposed between the inner magnetic body and the outer magnetic body, vibrating the diaphragm when current is provided to the voice coil; and
      a suspension coupled with the diaphragm.

2. The electronic device of claim 1, wherein the at least one speaker comprises a first speaker and a second speaker that are arranged approximately symmetrically relative to a home key of the electronic device when viewed from a front of the electronic device,
   wherein the speaker holes includes first speaker holes aligned to the first speaker and second speaker holes aligned to the second speaker.

3. The electronic device of claim 2, wherein the first speaker and the second speaker are arranged side by side, without overlapping with each other.

4. The electronic device of claim 1, further comprising:
   an internal support structure disposed between the at least one speaker and the touch screen display, and at least partially comprising metallic materials.

5. The electronic device of claim 4, wherein at least part of the housing includes a magnetic material, and the lower speaker enclosure is mounted on the at least part of the housing including the magnetic material.

6. The electronic device of claim 1, wherein the respective upper and lower speaker enclosures are configured to have the same thickness.

7. The electronic device of claim 1, wherein the respective upper and lower speaker enclosures are configured to have different thicknesses.

8. The electronic device of claim 1, wherein the touch screen display includes a digitizer for receiving an input by an electronic pen.

* * * * *